United States Patent
Gruber et al.

(10) Patent No.: US 8,191,530 B2
(45) Date of Patent: Jun. 5, 2012

(54) DEVICE FOR IGNITING A FUEL/AIR MIXTURE

(75) Inventors: Friedrich Gruber, Hippach (AT); Hang Lu, Kufstein (AT); Markus Kraus, Wiesing (AT)

(73) Assignee: GE Jenbacher GmbH & Co OHG, Jenbach (AT)

( * ) Notice: Subject to any disclaimer, the term of this patent is extended or adjusted under 35 U.S.C. 154(b) by 0 days.

(21) Appl. No.: 13/005,706

(22) Filed: Jan. 13, 2011

(65) Prior Publication Data

US 2011/0100322 A1    May 5, 2011

Related U.S. Application Data

(63) Continuation of application No. PCT/AT2009/000283, filed on Jul. 22, 2009.

(30) Foreign Application Priority Data

Jul. 22, 2008   (AT) ................................ A 1132/2008

(51) Int. Cl.
   *F02B 19/12*   (2006.01)
(52) U.S. Cl. .................... 123/260; 123/267; 123/169 EL
(58) Field of Classification Search .................. 123/260, 123/267, 253, 266, 256, 169 EL, 169 PH, 123/143 R
   See application file for complete search history.

(56) References Cited

U.S. PATENT DOCUMENTS

| | | | |
|---|---|---|---|
| 3,799,140 A * | 3/1974 | Vogelsang et al. | 123/277 |
| 3,974,412 A | 8/1976 | Pratt, Jr. | |
| 4,071,001 A * | 1/1978 | Goto | 123/260 |
| 4,332,223 A | 6/1982 | Dalton | |
| 4,582,475 A | 4/1986 | Hoppie | |
| 4,736,718 A * | 4/1988 | Linder | 123/267 |
| 4,744,341 A | 5/1988 | Hareyama et al. | |
| 4,765,293 A | 8/1988 | Gonzalez | |
| 5,222,993 A | 6/1993 | Crane | |
| 5,517,961 A | 5/1996 | Ward | |
| 5,947,076 A * | 9/1999 | Srinivasan et al. | 123/267 |
| 6,513,483 B2 * | 2/2003 | Riggs | 123/254 |
| 6,883,507 B2 | 4/2005 | Freen | |

FOREIGN PATENT DOCUMENTS

DE    31 51 547    7/1982

(Continued)

OTHER PUBLICATIONS

International Search Report issued Nov. 18, 2009 in International (PCT) Application No. PCT/AT2009/000283.
Austrian Patent Office Search Report issued Jan. 20, 2009 in Austrian patent application No. A 1132/2008.

(Continued)

*Primary Examiner* — Hieu T Vo
(74) *Attorney, Agent, or Firm* — Wenderoth, Lind & Ponack, L.L.P.

(57) ABSTRACT

The invention relates to a device for igniting a fuel/air mixture in the combustion chamber of an internal combustion engine. The device includes an electrode which is connected to a voltage source and extends into a precombustion chamber, and the precombustion chamber is separated at least in some regions from the combustion chamber by a wall. A control device or a regulating device is provided which controls the voltage supply to the electrode such that a corona discharge is carried out in the precombustion chamber. The wall has at least one opening for exchanging fluids between the combustion chamber and precombustion chamber, and a fluid inlet opens into the precombustion chamber.

17 Claims, 2 Drawing Sheets

FOREIGN PATENT DOCUMENTS

| | | |
|---|---|---|
| DE | 36 38 711 | 11/1987 |
| FR | 2 886 689 | 12/2006 |
| JP | 56-515 | 1/1981 |
| JP | 57-24412 | 2/1982 |
| RU | 2 099 572 | 12/1997 |

OTHER PUBLICATIONS

"Encyclopedia of Physics" (Third, Completely Revised and Enlarged Edition, Edited by Rita G. Lerner and George L. Trigg, vol. 1, pp. 84-89 and pp. 394-397).

* cited by examiner

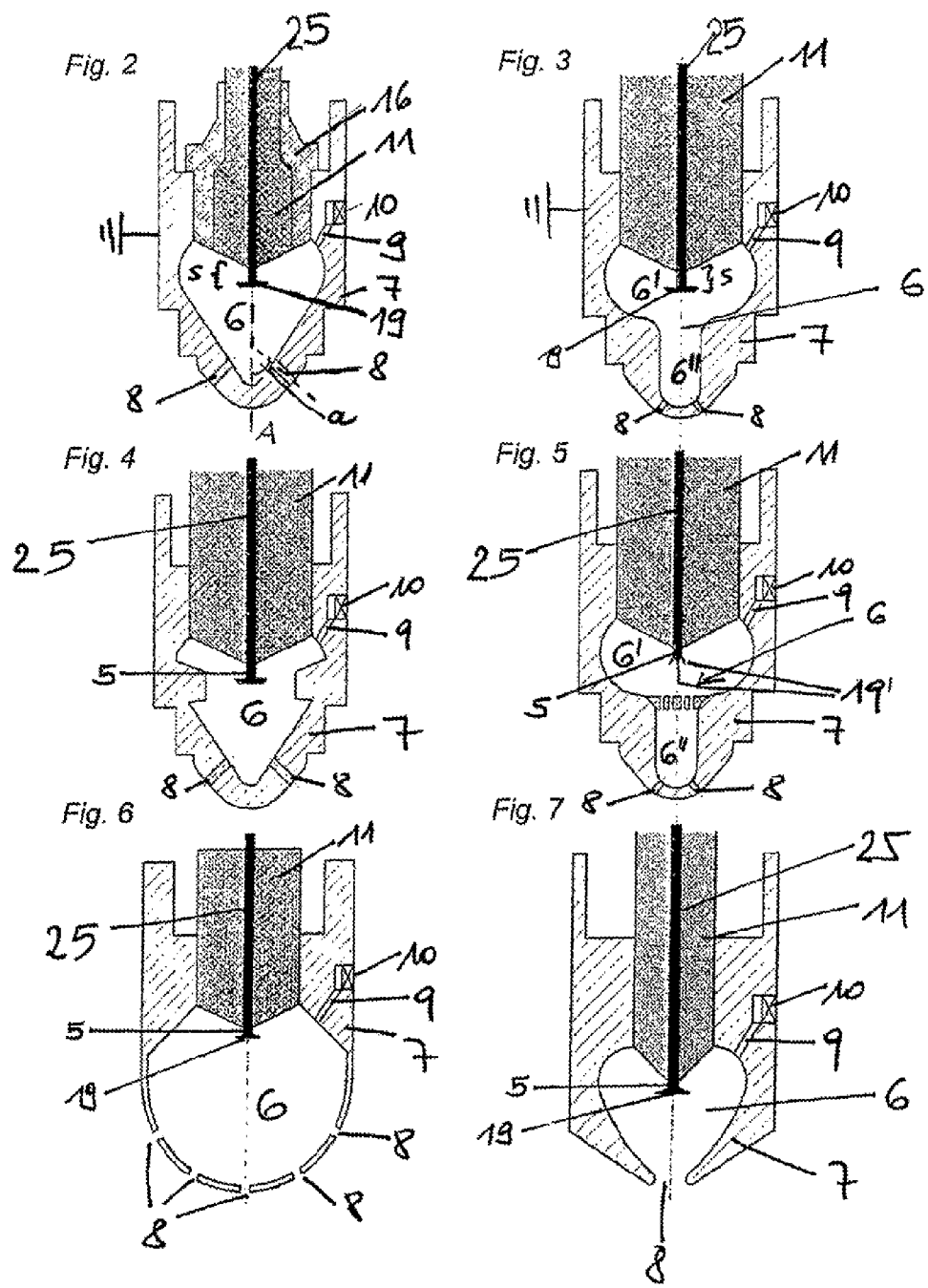

DEVICE FOR IGNITING A FUEL/AIR MIXTURE

This application is a Continuation of International application No. PCT/AT2009/000283, filed Jul. 22, 2009, the entire disclosure of which is incorporated herein by reference.

BACKGROUND OF THE INVENTION

The invention concerns a device for igniting a fuel/air mixture in the combustion chamber of an internal combustion engine, and the device includes an electrode connected to a voltage source and extending into a precombustion chamber. The precombustion chamber is separated at least region-wise from the combustion chamber by a wall, and a control device or regulating device regulates the supply of voltage to the electrode in such a way that a corona discharge takes place in the precombustion chamber. The wall has at least one opening for the exchange of fluids between the combustion chamber and the precombustion chamber. The invention further concerns a method of igniting a fuel/air mixture in the combustion chamber of an internal combustion engine. Finally the invention concerns an internal combustion engine including a device of the aforementioned kind.

In accordance with the state of the art, different ignition concepts are provided for the ignition of Otto engines. At the present time, ignition is effected for the predominant part by means of so-called spark ignition systems which include, for example, a spark plug. Because of constantly increasing demands on efficiency with at the same time low-emission combustion, recourse is increasingly made to alternative ignition technologies. One possibility is represented for example by so-called corona ignition as is described inter alia in U.S. Pat. No. 6,883,507 or FR 2 886 689 A1.

In corona ignition systems, the fuel/air mixture is ignited by high electric field strengths without so-called arc discharge. In contrast to spark ignition systems, in corona ignition only a glow discharge is allowed, but not the production of an avalanche-like arc discharge. Reference is made to arc discharge when a flashover is produced, with the production of an electric ignition spark between the electrodes. In regard to the difference between corona ignition and spark ignition, attention is directed to the relevant literature, for example to the "Encyclopedia of Physics" (Third, Completely Revised and Enlarged Edition, Edited by Rita G. Lerner and George L. Trigg, Volume 1, pages 84 through 89 and pages 394 through 397), the content of which is hereby incorporated and can thus be taken for granted.

The corona ignition system usually employs an electrode in the cylinder head of the internal combustion engine, which is preferably in the form of a tip, to produce high field strengths. Usually the combustion chamber is used as the counterpart electrode. The piston and the underside of the cylinder head form the ground electrode for the corona ignition device.

It has been found that combustion by means of corona ignition is heavily dependent on the combustion chamber geometry, the engine setup and the piston position. To come to grips with those problems, FR 2 886 689 A1 proposes effecting corona ignition in a precombustion chamber by way of which actual ignition is then effected in the combustion chamber. Precombustion chamber ignition is based on the concept that a first fuel/air mixture is ignited in the precombustion chamber and that fuel/air mixture ignited in that way can pass by way of transfer bores into the combustion chamber of the internal combustion engine where ignition of the actual fuel/air mixture takes place. High electric voltages are required to generate the electric field strengths leading to ignition of the fuel/air mixture, which voltages are crucially determined by the electrode arrangement and the mutual spacing of the electrodes. The high voltages however are limited by a number of factors. The voltages have to be generated and transmitted to the electrode in the cylinder head. The space required in the cylinder head and the choice of the insulator material sets limits in regard to the transmission of those high voltages. In the case of very large combustion chambers as occur for example in stationary gas Otto engines which represent a main area of use of the invention, the electrode arrangement in relation to the combustion chamber geometry is problematical as, on the one hand, the piston covers very great distances and, on the other hand, the required voltages are very high due to the spatial arrangement involved. If adjustment of the ignition time is required or if long corona times are necessary for operation of the internal combustion engine, the need for the high voltage varies very greatly.

To implement corona ignition independently of the shape and the piston position it is therefore desirable for the ground electrode to be in the form of a precombustion chamber.

The kind of precombustion chamber ignition described in FR 2 886 689 shows that the fuel is injected into the combustion chamber where it becomes stratified. Injection of the fuel is effected in such a way that a given proportion of the fuel can pass into the precombustion chamber by way of the openings. An internal combustion engine operated in that way tends to have ignition misfires in operation. For example, deposits can block the openings. In the case of conventional spark discharge, such deposits are quickly burnt away. In the case of corona ignition, the deposits are not burnt away because of the lower field strengths. Corona ignition can be operated in a stable fashion only in a narrow band of electric field strength. Deposits which can prevent proper fluid exchange between the precombustion chamber and the combustion chamber can therefore have the result that, because of the inadequate fluid exchange, the voltage regulator re-adjusts the supply of voltage to the electrode. In the extreme case, that can mean that the electrode and the basic highly sensitive electronic components thereof are permanently damaged.

SUMMARY OF THE INVENTION

Therefore, the object of the present invention is to provide a device of the kind set forth in the opening part of this specification, in which the electronic components of the corona discharge can be less easily damaged.

That object is attained with a device, preferably an ignition device, of the general kind set forth in the opening part of this specification, which is characterized by a fluid inlet directly opening into the precombustion chamber. A fluid can be let in by way of the precombustion fluid inlet to flush the precombustion chamber. In the preferred case, the fluid inlet is connected to a fuel source as in that way fuel or a fuel/air mixture can be let into the precombustion chamber and the supply of fuel is effected independently of the conventional inlet valves. The fluid inlet according to the invention is therefore provided in addition to the at least one inlet valve and the at least one exhaust valve. The precombustion fluid inlet opens directly into the precombustion chamber, while the main inlet valves which supply the fuel to the main combustion chamber and also the exhaust valves open directly into the main combustion chamber.

The aforementioned object is also attained by a method of igniting a fuel/air mixture in the combustion chamber of an internal combustion engine by means of corona ignition with a device of the aforementioned kind, wherein a fluid, preferably fuel, is let into the precombustion chamber by way of the fluid inlet.

Due to the direct inlet of fuel, the corona discharge in the precombustion chamber is no longer dependent on fuel diffusing out of the main combustion chamber of the internal combustion engine into the precombustion chamber, and it is possible to have recourse directly to fuel introduced by way of the precombustion fluid inlet. In practice, very frequently pure fuel or at least a richer fuel/air mixture is passed into the precombustion chamber than is passed into the main combustion chamber. The expression "richer fuel/air mixture" is used to mean that the ratio of fuel to oxygen is greater than in the case of a leaner mixture. A richer mixture improves the firing condition and reduces the energy required for ignition.

So that the corona in the precombustion chamber can propagate well and can develop well, it has proven to be desirable if the precombustion chamber has regions with different cross-sectional internal surfaces, in which the cross-sectional internal surface is smaller in the region of the at least one opening than the cross-sectional internal surface in the region in which the electrode passes into the precombustion chamber. In that respect, in a variant it can be provided that the precombustion chamber has a multi-part configuration. For example, there can be a first precombustion chamber which is arranged in the region in which the electrode passes into the precombustion chamber and a second precombustion chamber in the region of the at least one opening. Desirably, the volume of the first precombustion chamber is larger than that of the second precombustion chamber. In that way, corona ignition can take place particularly efficiently. In that respect it has proven to be particularly desirable if the fluid inlet opens into the first precombustion chamber.

The simplest configuration provides that the opening is in the form of a bore. For optimum ignition operation in the combustion chamber, the longitudinal extent of the bore includes an angle different from 180° with the longitudinal extent of the electrode within the precombustion chamber. In the simplest case, the wall with the exception of the at least one opening for the exchange of fluids completely surrounds the electrode. In regard to the fluid inlet, it has proven to be desirable if the fluid inlet includes a valve. That variant has proven to be particularly desirable in gas Otto engines which represent a preferred area of use of the invention. Gas Otto engines are operated with a fuel which is gaseous under normal conditions such as for example methane.

Various electrode forms have proven to be desirable in use. Besides a conventional elongate tip form electrodes with a spherical end, with a mushroom-shaped end (that is to say approximately T-shaped in cross-section), with a plurality of ends which preferably converge to a point, with flattened-off end, etc. were advantageous.

Particularly effective corona ignition can be achieved when the electrode is approximately T-shaped in cross-section in the region of the precombustion chamber. In a further variant, it has proven to be desirable if the electrode has a plurality of tips.

It is precisely in precombustion chambers that non-homogenous fuel distribution can occur so that regions can occur with higher $\lambda$-values and lower $\lambda$-values (the $\lambda$-value is used to denote the combustion air ratio, that is to say the ratio of air to fuel for combustion, wherein $\lambda=1$ represents a stoichiometric ratio, $\lambda$ greater than 1 represents an insufficiency of air, and $\lambda$, smaller than 1 represents an excess of air). Corona ignition has the advantage that it is precisely those regions with a lower $\lambda$, that are ignited first and thus ideal ignition takes place. The streamers are thus optimally distributed in space.

Due to the shape of the electrodes, that is to say the actual electrode which extends into the precombustion chamber and the counterpart electrode which is generally formed by the precombustion chamber wall, that also affords advantages in terms of electric field control.

Besides the aforementioned device and the aforementioned method, the invention also concerns an internal combustion engine having such a device and for carrying out such a method. Preferably the internal combustion engine is a gas Otto engine, in a stationary mode.

BRIEF DESCRIPTION OF THE DRAWINGS

Further advantages and details of the invention will be apparent from the specific description and the following drawings, in which:

FIGS. 2-7 show variants of the most important regions of devices according to the invention.

DETAILED DESCRIPTION OF THE INVENTION

Figure 1:
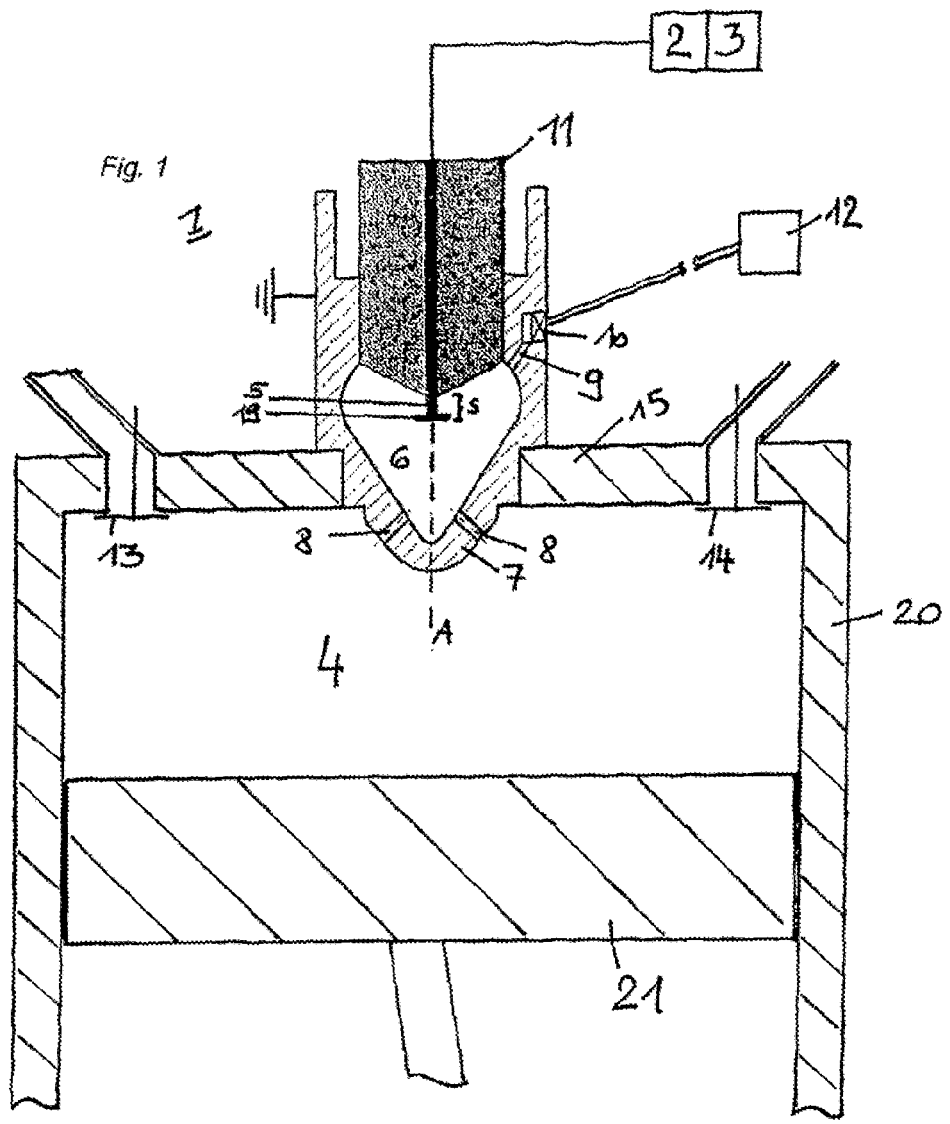
FIG. 1 is a roughly diagrammatic view in cross-section of a device according to the invention.

FIG. 1 shows a device 1 for the ignition of a fuel/air mixture in the combustion chamber 4 of an internal combustion engine which is shown only roughly in diagrammatic form. For reasons of clarity of the drawing, only one cylinder 20 is shown, in which a piston 21 moves up and down. The device 1 includes an electrode 5 which is connected to a voltage source 2 by way of an energy transfer unit 25 (here in the form of an electric lead). The electrode 5 extends by a portion S into the precombustion chamber 6 of the device 1. The precombustion chamber 6 is region-wise separated from the combustion chamber 4 by the wall 7. The wall 7 forms the counterpart electrode so that an electric field is produced between the electrode 5 and the wall 7 which is grounded when the voltage source 2 supplies the electrode 5 with voltage. With a sufficient field strength, a corona is formed in the precombustion chamber 6. For that purpose, there is also provided a control device or regulating device 3 which regulates the supply of voltage to the electrode 5 in such a way that the corona discharge takes place in the precombustion chamber 6. The control or regulating device 3 and the voltage source 2 are shown together and only in roughly diagrammatic form for the sake of simplicity. The voltage source 2 and the control or regulating device 3 can be selected for example as described in FR 2 886 689 A1 or in U.S. Pat. No. 6,883,507, but other voltage sources 2 and control or regulating devices 3 are also conceivable.

The wall 7 has a plurality of openings 8 (two openings are visible in the cross-section here in the form of bores) which permit the exchange of fluids between the main combustion chamber 4 and the precombustion chamber 6. A fluid can be introduced through the precombustion fluid inlet 9 which opens directly into the precombustion chamber 6. In the illustrated embodiment, the fluid inlet 9 is connected to a fuel source 12 by way of which pure fuel can be introduced. It would equally be possible to introduce a fuel/air mixture so that in that case for example there could be provided a mixer device such as a gas mixer which previously mixes fuel such as for example methane with air. To regulate the supply of fuel in the present case, there is an inlet limiter in the form of a valve 10. The valve 10 is desirable for example in the use which is particularly preferred according to the invention in stationary gas Otto engines as gaseous fuel can be metered with the valve. However, other inlet limiters 10 provided in accordance with the state of the art are also possible.

The lead 25 is enclosed by an insulator 11. The electrode 5 projects with a portion S into the precombustion chamber 6 from the insulator 11. The insulator 11 encloses the lead 25 and electrically insulates it from the wall 7.

In the region of the openings 8, the precombustion chamber 6 is narrower in cross-section than in the region in which the electrode 5 passes into the precombustion chamber 6. That means that the cross-section, that is to say that region perpendicular to the longitudinal extent A of the electrode 5, is of a larger cross-section than in the region of the openings 8. In the illustrated embodiment, the electrode 5 has a substantially T-shaped configuration in the cross-section within the precombustion chamber 6 because, that way, good discharge can take place. As the drawing shows, the device 1 in the condition of installation extends into the combustion chamber 4 of an internal combustion engine. The ignition device 1 could be, for example, screwed into the cylinder head 15 of the internal combustion engine by means of a screwthreaded (not shown). The illustrated embodiment of FIG. 1 and also those in the other Figures show that the insulator 11 has a configuration tapering to a point towards the end of the electrode, between the lead 25 and the wall 7. That stabilizes the electrode 5 from a mechanical point of view on the one hand and at the same time ensures a better flow of fuel/air mixture in the precombustion chamber.

After corona ignition has occurred in the region of the precombustion chamber 6, the glow discharge-ignited fuel/air mixture can pass by way of the openings 8 into the combustion chamber 4 and there ignite the actual fuel/air mixture. The fuel/air mixture in the combustion chamber 4 is introduced by way of the inlet valve 13. After ignition, the combustion residue can be discharged again by way of the exhaust valve 14. As illustrated, the precombustion fluid inlet 9 is separated from the conventional inlet valves 13 and exhaust valves 14. That is to say, there is provided a fluid supply 9 which is separate from the inlet valve or valves 13 and which does not open directly into the combustion chamber 4 but instead opens directly into the precombustion chamber 6.

FIGS. 2 through 7 show different variants of devices 1 according to the invention, in which some components which can have the same design configuration for example as in FIG. 1 have been omitted for reasons of improved clarity of the drawings. In particular, in that respect the geometry of the individual precombustion chambers 6 is described. The variants in FIGS. 3 and 5 show two-part precombustion chambers 6 having a first precombustion chamber 6' and a second precombustion chamber 6", in which the volume of the first precombustion chamber 6' is larger than the volume of the second precombustion chamber 6". The fluid inlet 9 opens into the region of the first precombustion chamber 6'. Between the first precombustion chamber 6' and the second precombustion chamber 6" in FIG. 5 there are also constrictions which influence the through-passage of fluid and the flow of fluid between the two precombustion chambers 6', 6". The variant in FIG. 4 shows an enlargement rearwardly, that is to say in the region in which the electrode 5 passes into the precombustion chamber 6. That favors the flow characteristics in the precombustion chamber 6. FIG. 6 shows a simple hemispherical precombustion chamber geometry having a plurality of openings 8 in a plurality of directions. In FIG. 7, there is only a single opening in the prolongation of the longitudinal extent A of the electrode 5 in the region of the precombustion chamber 6. In the examples in FIGS. 1 through 5 the bores 8 include an angle ($\alpha$) different from 180° with the longitudinal extent of the electrode 5 in the precombustion chamber 6. In addition, the embodiment of FIG. 2 also has a so-called spark plug base 16 which better anchors the insulator 11 together with the electrode 5 to the housing together with the wall of the device 1.

In that respect the variants in FIGS. 1 through 4 and FIGS. 6 and 7 show electrodes 5 which have an approximately T-shaped cross-sectional configuration in the region of the precombustion chamber 6 (that is to say where they issue from the insulator 11 and extend into the precombustion chamber 6). In principle, the shape also corresponds to a mushroom shape or a nail shape (that is to say a disk-shaped end 19 is mounted to a shaft portion). In the FIG. 5 example, the electrode 5 has a plurality of ends 19' which form a kind of crown shape.

As already mentioned hereinbefore in the description, the shape of the electrode end 19 however could for example also be spherical or of some other advantageous shape.

The openings 8 can be of different shapes. For example, for the sake of simplicity, there can be round openings 8 (for example bores). Alternatively, they can also be polygonal—this also depends in particular on the geometry of the combustion chamber 4. In some variants, it has been found that the size of the openings 8 can be varied depending on the combustion chamber geometry 4. In addition, there can be cross-sections of differing sizes, when a plurality of openings 8 are involved. It will be noted, however, that the simplest variant provides a plurality of equal-sized openings 8. The precombustion chamber 6 can also have a uniform surface or alternatively thereto point-shaped raised portions for field control for the corona discharge. The precombustion chamber 6 can be flushed with fuel or fuel/air mixture. If only pure fuel is to be introduced, then a small amount of oxygen from the fuel/air mixture should flow back into the precombustion chamber 6 from the combustion chamber 4 by way of the transfer openings 8. Alternatively thereto, in normal operation, the precombustion chamber 6 can be supplied only with a fuel/air mixture from the combustion chamber 4, and the supply of gas is effected by way of the fluid inlet 9 only when there is a blockage or a disturbance, which can be regulated or controlled by way of the regulating or control device 4.

The invention claimed is:

1. A device for igniting a fuel/air mixture in a main combustion chamber of an internal combustion engine, said device comprising:
    a precombustion chamber separated at least region-wise from the main combustion chamber by a wall, said wall having an opening for exchanging fluids between the main combustion chamber and said precombustion chamber;
    a fluid inlet opening directly into said precombustion chamber and configured to supply fluid directly into said precombustion chamber;
    an electrode connected to a voltage source and extending into said precombustion chamber; and
    one of a control device or a regulating device configured to regulate a supply of voltage to said electrode so that a corona discharge occurs in said precombustion chamber.

2. The device as set forth in claim 1, wherein said fluid inlet is connected to a fuel source to supply fuel from said fuel source directly into said precombustion chamber.

3. The device as set forth in claim 1, wherein said precombustion chamber has a plurality of internal regions with different cross-sectional areas, including a first internal region whereat said opening is located and a second internal region whereat said electrode is located, a cross-sectional area of said first internal region being smaller than a cross-sectional area of said second internal region.

4. The device as set forth in claim 1, wherein said precombustion chamber has a multi-part configuration comprising a first precombustion chamber at said electrode and a second precombustion chamber at said opening, a volume of said first precombustion chamber being larger than a volume of said second precombustion chamber.

5. The device as set forth in claim 4, wherein said fluid inlet opens into said first precombustion chamber.

6. The device as set forth in claim 1, wherein said opening is formed as a bore.

7. The device as set forth in claim 6, wherein a longitudinal axis of said bore forms an angle different than 180° with a longitudinal axis of said electrode within said precombustion chamber.

8. The device as set forth in claim 1, wherein said wall completely surrounds said electrode so as to close off said electrode from the main combustion chamber except for said opening.

9. The device as set forth in claim 1, wherein said fluid inlet includes a valve.

10. The device as set forth in claim 1, wherein a portion of said electrode within said precombustion chamber has a substantially T-shaped cross-sectional configuration.

11. The device as set forth in claim 1, wherein an end of said electrode has a shape selected from a group consisting of a spherical shape, a mushroom shape, a bar shape, a star shape, and a point shape.

12. The device as set forth in claim 1, wherein said wall forms a counterpart electrode.

13. The device as set forth in claim 1, wherein said fluid inlet comprises a bore extending through said wall so as to allow fuel from a fuel source to be supplied directly into said precombustion chamber without passing through the main combustion chamber.

14. A method of igniting a fuel/air mixture in the main combustion chamber of an internal combustion engine using the device as set forth in claim 1, said method comprising:
supplying fuel directly into said precombustion chamber through said fluid inlet; and
regulating a supply of the fuel to said precombustion chamber to generate a corona discharge in said precombustion chamber.

15. The method as set forth in claim 14, wherein said supplying fuel comprises supplying gaseous fuel.

16. The method as set forth in claim 14, wherein said supplying fuel comprises introducing pure fuel directly into said precombustion chamber through said fluid inlet.

17. An internal combustion engine including the device as set forth in claim 1.

* * * * *